United States Patent
Yang (10) Patent No.: US 7,800,927 B2
(45) Date of Patent: *Sep. 21, 2010

(54) METHOD AND CIRCUIT FOR PROVIDING COMPENSATIONS OF CURRENT MODE POWER CONVERTERS

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 19 days.

This patent is subject to a terminal disclaimer.

(21) Appl. No.: 11/638,506

(22) Filed: Dec. 14, 2006

(65) Prior Publication Data

US 2008/0143311 A1    Jun. 19, 2008

(51) Int. Cl.
    *H02H 7/00*    (2006.01)
(52) U.S. Cl. .................................................... 363/56.1
(58) Field of Classification Search ................ 323/282, 323/326, 277, 274–276, 284, 285, 288, 290; 363/56.1, 21.01
    See application file for complete search history.

(56) References Cited

U.S. PATENT DOCUMENTS

| | | | | |
|---|---|---|---|---|
| 4,837,495 A | * | 6/1989 | Zansky | 323/222 |
| 5,335,162 A | * | 8/1994 | Martin-Lopez et al. | 363/97 |
| 5,499,184 A | * | 3/1996 | Squibb | 363/100 |
| 5,903,452 A | * | 5/1999 | Yang | 363/97 |
| 6,385,059 B1 | * | 5/2002 | Telefus et al. | 363/21.15 |
| 6,611,131 B2 | * | 8/2003 | Edwards | 323/282 |
| 6,665,197 B2 | * | 12/2003 | Gong et al. | 363/21.01 |
| 6,737,845 B2 | * | 5/2004 | Hwang | 323/284 |
| 6,768,655 B1 | * | 7/2004 | Yang et al. | 363/21.01 |
| 6,914,486 B2 | * | 7/2005 | Varner et al. | 330/267 |
| 7,088,598 B2 | * | 8/2006 | Yang et al. | 363/21.01 |
| 7,271,649 B2 | * | 9/2007 | Chiu et al. | 330/9 |
| 7,378,822 B2 | * | 5/2008 | Liao | 323/222 |
| 2006/0284607 A1 | * | 12/2006 | Isobe | 323/282 |
| 2008/0144343 A1 | * | 6/2008 | Yang | 363/78 |

* cited by examiner

*Primary Examiner*—Adolf Berhane
*Assistant Examiner*—Emily Pham
(74) *Attorney, Agent, or Firm*—Rosenberg, Klein & Lee (57) ABSTRACT

A method and circuit for providing compensation of a power converter is proposed. A current sense circuit is coupled to receive a switching current for generating a current signal. A signal generation circuit is developed to generate a first compensation signal and a second compensation signal for adjusting the current signal. The first compensation signal is coupled to adjust the current signal for the output power limit of the power converter. The second compensation signal is coupled to adjust the current signal for the slope compensation. The slope of the first compensation signal is decreased when the power transistor is turned on. The slope of the second compensation signal is increased in response to the turn on of the power transistor.

29 Claims, 5 Drawing Sheets

METHOD AND CIRCUIT FOR PROVIDING COMPENSATIONS OF CURRENT MODE POWER CONVERTERS

FIELD OF THE INVENTION

The present invention relates to a power converter. More particularly, the present invention relates to a switching power converter.

BACKGROUND OF THE INVENTION

Figure 1:
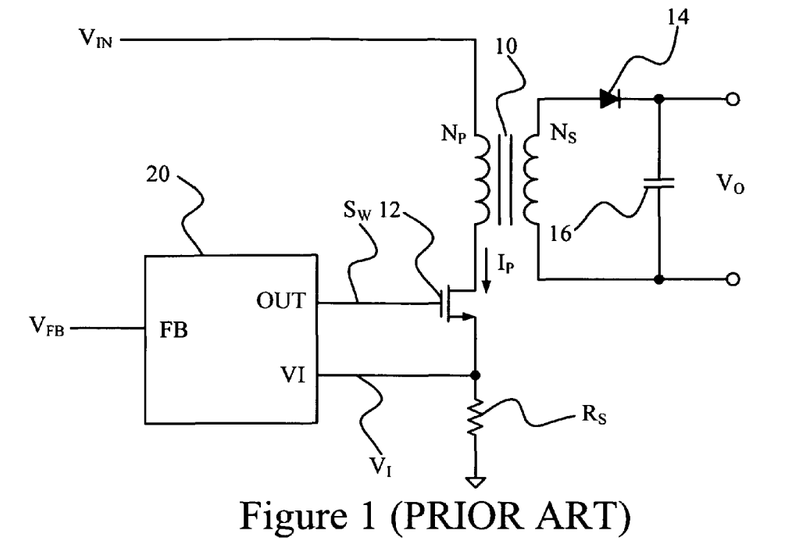
FIG. 1 shows a circuit diagram of a traditional current mode power converter.

The switching power control is a conventional technology used in power converter to control and regulate the output power. Referring to FIG. 1, a circuit schematic of a current mode power converter circuit is shown. A control circuit 20 generates a switching signal $S_W$ at an output terminal OUT to regulate the output of the power converter in response to a feedback signal $V_{FB}$. The switching signal $S_W$ drives a power transistor 12 for switching a transformer 10. In general, the feedback signal $V_{FB}$ is obtained at a feedback terminal FB of the control circuit 20 by detecting the output voltage $V_O$ of the power converter through an optical-coupler or a feedback circuit including an auxiliary winding (Figure not shown). The voltage of the auxiliary winding is related to the output voltage $V_O$ of the power converter. Therefore the feedback signal $V_{FB}$ is generated in response to the output voltage $V_O$.

The primary winding $N_P$ of the transformer 10 is coupled to receive an input voltage $V_{IN}$. The secondary winding $N_S$ is used to output the output voltage $V_O$. A rectifier 14 is coupled to the secondary winding $N_S$. A filter capacitor 16 is coupled to the rectifier 14 and the secondary winding $N_S$. A resistor $R_S$ is connected serially with the power transistor 12 to generate a current signal $V_1$ in response to a switching current $I_P$ of the transformer 10. The current signal $V_1$ indicates the switching current $I_P$. The current signal $V_1$ is coupled to a current-sense terminal VI of the control circuit 20 to develop a current loop for the current mode control.

Figure 2:
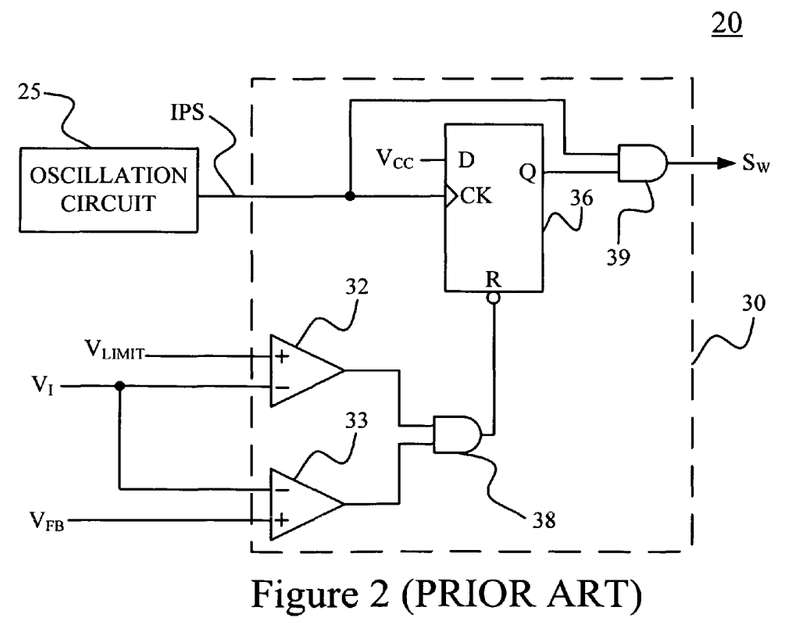
FIG. 2 shows the circuit schematic of a traditional control circuit of the power converter.

FIG. 2 shows a circuit diagram of the traditional control circuit 20. The control circuit 20 includes an oscillation circuit 25 and a switching circuit 30. The switching circuit 30 includes a first comparator 32, a second comparator 33, a flip-flop 36 and two AND gates 38, 39 to generate the switching signal $S_W$. The oscillation circuit 25 generates an oscillation signal IPS and transmits the oscillation signal IPS to a clock input terminal CK of the flip-flop 36 for enabling the switching signal $S_W$. An output terminal Q of the flip-flop 36 is connected to an input terminal of the AND gate 39. Another input terminal of the AND gate 39 is coupled to receive the oscillation signal IPS. The first comparator 32 is coupled to receive the current signal $V_I$ and a maximum threshold $V_{LIMIT}$ to compare the current signal $V_I$ with the maximum threshold $V_{LIMIT}$. The second comparator 33 is coupled to receive the current signal $V_I$ and the feedback signal $V_{FB}$. The current signal $V_I$ is utilized to compare with the feedback signal $V_{FB}$ by the second comparator 33 for regulating the output of the power converter. If the current signal $V_I$ is greater than the maximum threshold $V_{LIMIT}$, the control circuit 20 will disable the switching signal $S_W$ and restrict the maximum output power through the AND gate 38. The function of output power limit is generally used for overload and short circuit protections.

Figure 3:
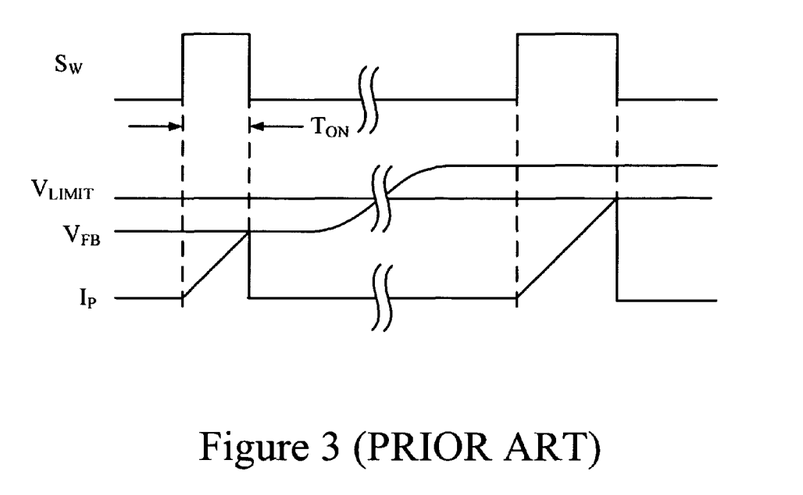
FIG. 3 shows waveforms of the power converter.

Referring to FIG. 3, the operation of the feedback loop and the current limit is shown. The switching current $I_P$ indicates the current signal $V_1$. When the current signal $V_1$ is lower than the maximum threshold $V_{LIMIT}$, the switching signal $S_W$ is controlled by the feedback signal $V_{FB}$. The switching signal $S_W$ is restricted by the maximum threshold $V_{LIMIT}$ once the current signal $V_1$ is higher than the maximum threshold $V_{LIMIT}$. In recent development, many technologies have been proposed to optimize the control and protection functions of the current mode power converter. Among them, the slope compensation is described in "Adaptive slope compensator for current mode power converters" by Yang, U.S. Pat. No. 5,903,452. For the output power limit, two compensation schemes are disclosed, such as "PWM controller for controlling output power limit of a power supply" by Yang et al., U.S. Pat. No. 6,611,439; "PWM controller having a saw limiter for output power limit without sensing input voltage" by Yang et al., U.S. Pat. No. 6,674,656. However, the disadvantage of these prior arts is the loose accuracy of the compensation. The slope compensation will affect the compensation of the protection function. This shortcoming is the main object of the present invention to overcome. Besides, a simpler scheme of compensation circuits is required to reduce the cost of the power converter.

SUMMARY OF THE INVENTION

The invention provides a method and a circuit for controlling a current mode power converter. A power transistor is coupled to a transformer for switching the transformer. A current sense circuit is developed to generate a current signal in response to a switching current of the transformer. A switching circuit is coupled to receive the current signal and a feedback signal to generate a switching signal for controlling the power transistor and regulating the output of the power converter. A signal generation circuit generates a first compensation signal and a second compensation signal for compensations. The first compensation signal is coupled to adjust the current signal for the output power limit of the power converter. The second compensation signal is coupled to adjust the current signal for the slope compensation.

Furthermore, an oscillation circuit is equipped to generate an oscillation signal for producing the switching signal and compensation signals. The first compensation signal is coupled to adjust the current signal to generate a first signal for limiting the switching current. The slope of the first compensation signal is decrease when the power transistor is turned on. The second compensation signal is coupled to adjust the current signal for generating a second signal. The slope of the second signal is increase in response to the turn on of the power transistor. The second signal is further coupled to the feedback loop of the power converter. The offset of the first compensation signal and the second compensation signal is approximate zero.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention together with the description, which serve to explain the principles of the invention.

DESCRIPTION OF THE PREFERRED EMBODIMENTS

Figure 4:
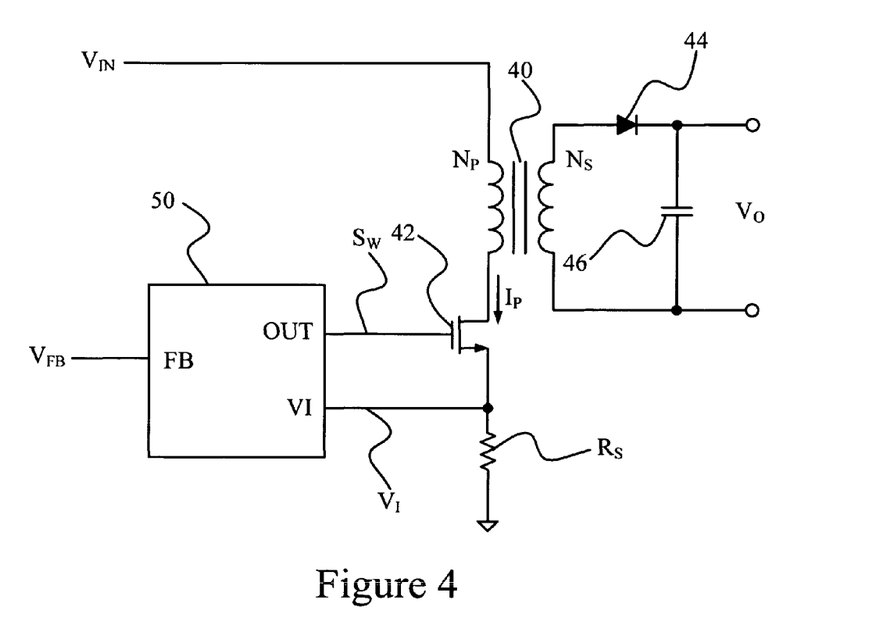
FIG. 4 shows a circuit diagram of a current mode power converter in accordance with the present invention.

FIG. 4 shows a circuit diagram of a current mode power converter in accordance with the present invention. As shown in the FIG. 4, the power converter includes a transformer 40, a power transistor 42, a rectifier 44, a filter capacitor 46, a control circuit 50 and a resistor $R_S$. The transformer 40 includes a primary winding $N_P$ and a secondary winding $N_S$. The primary winding $N_P$ is coupled to receive the input voltage $V_{IN}$. The primary winding $N_P$ is further coupled to the power transistor 42. The power transistor 42 is used to switch the transformer 40. A current sense circuit developed by the resistor $R_S$ is coupled to the power transistor 42 to generate a current signal $V_1$ in response to a switching current $I_P$ flowing through the transformer 40. The switching current $I_P$ will flow to the resistor $R_S$ through the power transistor 42.

The control circuit 50 includes a current-sense terminal VI, a feedback terminal FB and an output terminal OUT to generate a switching signal $S_W$ to regulate the output of the power converter. The current-sense terminal VI and the feedback terminal FB are coupled to receive the current signal $V_1$ and a feedback signal $V_{FB}$ respectively. The feedback signal $V_{FB}$ is generated for the feedback regulation in response to the output of the power converter. The output terminal OUT generates the switching signal $S_W$ in response to the current signal $V_1$ and the feedback signal $V_{FB}$. A rectifier 44 is coupled to the secondary winding $N_S$ of the transformer 40. A filter capacitor 46 is coupled to the rectifier 44 and the secondary winding $N_S$.

Figure 5:
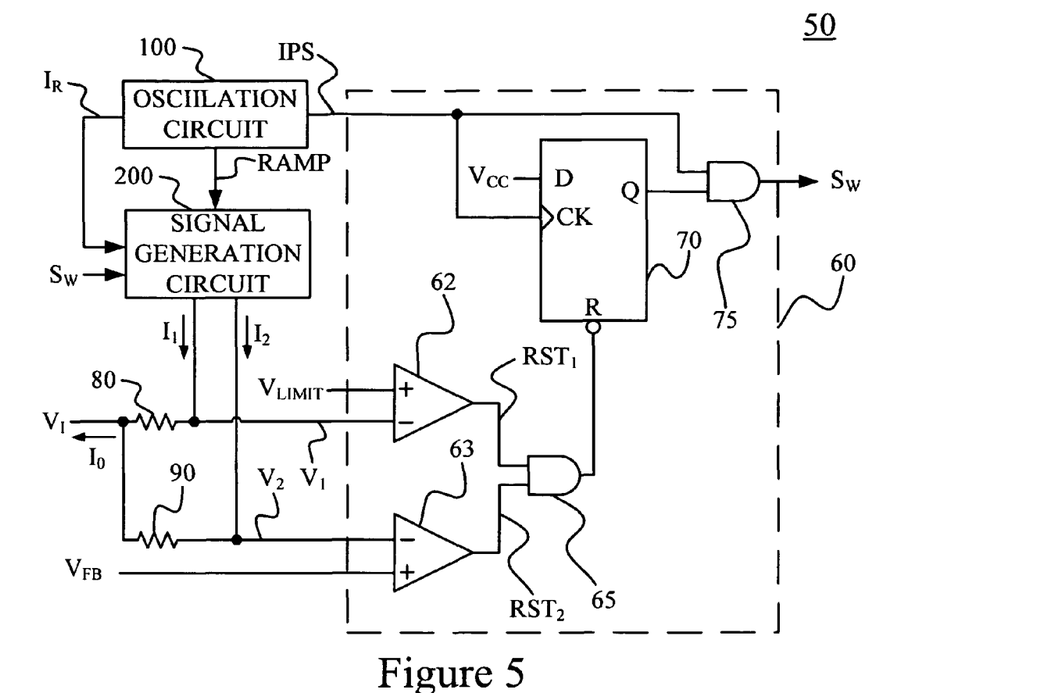
FIG. 5 shows a circuit diagram of a preferred embodiment of a control circuit in accordance with the present invention.

FIG. 5 illustrates a circuit schematic of the control circuit 50 according to the present invention. It includes a switching circuit 60, two resistance devices 80, 90, an oscillation circuit 100 and a signal generation circuit 200. The oscillation circuit 100 generates an oscillation signal IPS, a reference current signal $I_R$, and a ramp signal RAMP coupled to the switching circuit 60 and the signal generation circuit 200 respectively. The switching circuit 60 includes a flip-flop 70, a first comparator 62, a second comparator 63 and two AND gates 65, 75 for generating the switching signal $S_W$. The switching signal $S_W$ is used for controlling the power transistor 42 and switching the transformer 40 (shown in FIG. 4) in response to the oscillation signal IPS and the feedback signal $V_{FB}$ for regulating the output of the power converter.

The signal generation circuit 200 is used for generating a first compensation signal $I_1$ and a second compensation signal $I_2$ in accordance with the ramp signal RAMP and the switching signal $S_W$. The first compensation signal $I_1$ and the second compensation signal $I_2$ are connected to the resistance device 80 and the resistance device 90 respectively for adjusting the current signal $V_1$. The second comparator 63 is coupled to receive the current signal $V_1$ through the resistance device 90. The first comparator 62 is coupled to receive the current signal $V_1$ through the resistance device 80. The resistance device 80 associated with the first compensation signal $I_1$ and the current signal $V_1$ generates a first signal $V_1'$, which means the first compensation signal $I_1$ can adjust the current signal $V_1$ to generate the first signal $V_1'$. The resistance device 90 associated with the second compensation signal $I_2$ and the current signal $V_1$ generates a second signal $V_2$, which means the second compensation signal $I_2$ can adjust the current signal $V_1$ to generate the second signal $V_2$.

An input terminal D is coupled to receive the supply voltage $V_{CC}$. An input terminal of the AND gate 75 is connected to an output terminal Q of the flip-flop 70 to generate the switching signal $S_W$ at an output terminal of the AND gate 75. Another input terminal of the AND gate 75 is coupled to receive the oscillation signal IPS to control the maximum duty cycle of the switching signal $S_W$. The oscillation signal IPS is connected to a clock input terminal CK of the flip-flop 70 to turn on the switching signal $S_W$. The turn off of the switching signal $S_W$ is controlled through the AND gate 65. An output terminal of the AND gate 65 is coupled to a reset terminal R of the flip-flop 70. The input terminals of the AND gate 65 are connected to the output terminals of the first comparator 62 and the second comparator 63 to receive a first reset signal $RST_1$ and a second reset signal $RST_2$.

An output terminal of the second comparator 63 generates the second reset signal $RST_2$. The input terminals of the second comparator 63 are coupled to receive the feedback signal $V_{FB}$ and the second signal $V_2$ respectively. The feedback signal $V_{FB}$ is coupled to the output of the power converter for the feedback regulation. An output terminal of the first comparator 62 generates the first reset signal $RST_1$. The input terminals of the first comparator 62 are coupled to receive the maximum threshold $V_{LIMIT}$ and the first signal $V_1'$ respectively.

The maximum threshold $V_{LIMIT}$ is a constant value to serve as a current limit threshold. Therefore, the second compensation signal $I_2$ coupled to adjust the current signal $V_1$ to generate the second signal $V_2$ is used to achieve the slope compensation for stabilizing the feedback loop of the power converter. The first compensation signal $I_1$ coupled to adjust the current signal $V_1$ to generate the first signal $V_1'$ is utilized to compensate the output power limit of the power converter. It is to say, the current signal $V_1$ is adjusted by the first compensation signal $I_1$ for limiting the switching current $I_P$ more precisely. The maximum output power of the power converter can thus be keep as a constant versus to the variation of the input voltage $V_{IN}$ of the power converter.

Figure 6:
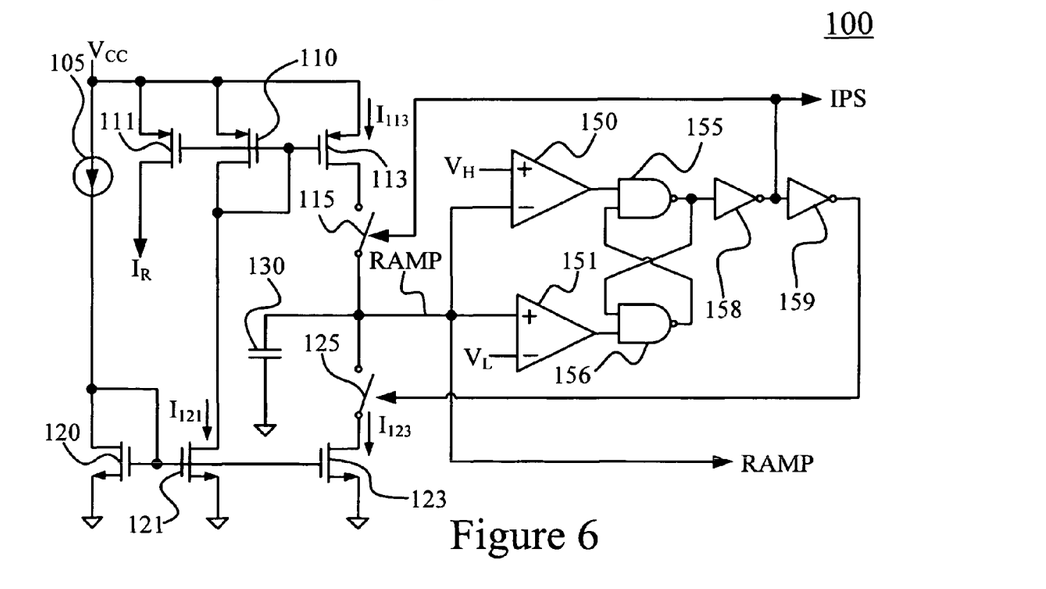
FIG. 6 shows a circuit diagram of a preferred embodiment of an oscillation circuit in accordance with the present invention.

FIG. 6 shows the circuit diagram of the oscillation circuit 100. As shown in the FIG. 6, A current source 105 is connected to the supply voltage $V_{CC}$ and a current mirror circuit to generate the reference current signal $I_R$, a charge current $I_{113}$ and a discharge current $I_{123}$. The current mirror circuit includes a plurality of the transistors 110, 111, 113, 120, 121 and 123. The sources of the transistors 120, 121, 123 are coupled to the ground. The gates of the transistors 120, 121, 123, the drain of the transistor 120 and the current source 105 are coupled together. The drain of the transistor 123 generates the discharge current $I_{123}$ in response the current of the current source 105. The sources of the transistors 110, 111 and 113 are coupled to the supply voltage $V_{CC}$. The gates of the transistors 110, 111, 113 and the drain of the transistor 110 are coupled together. The drain of the transistor 110 is further coupled to the drain of the transistor 121 to receive a current $I_{112}$. The drains of the transistors 111 and 113 generate the reference current signal $I_R$ and the charge current $I_{113}$ respectively. The reference current signal $I_R$ is transmitted to the signal generation circuit 200 (shown in FIG. 6 and FIG. 7).

The charge current $I_{113}$ is serially connected with a switch 115 for charging a capacitor 130. The discharge current $I_{123}$ is serially connected with a switch 125 for discharging the capacitor 130. A ramp signal RAMP is therefore produced on the capacitor 130.

Comparators 150, 151, NAND gates 155, 156 and an inverter 158 are used to generate the oscillation signal IPS to control the switch 115. The oscillation signal IPS is further utilized to control the switch 125 through an inverter 159. The ramp signal RAMP and the oscillation signal IPS are further transmitted to the signal generation circuit 200 and the switching circuit 60 respectively (shown in FIG. 5). The comparator 150 is coupled to receive a high threshold voltage $V_H$ and the ramp signal RAMP to compare the ramp signal RAMP with the high threshold voltage $V_H$. The comparator 151 is coupled to receive a low threshold voltage $V_L$ and the ramp signal RAMP to compare the ramp signal RAMP with the low threshold voltage $V_L$. An input terminal of the NAND gate 155 is coupled to an output terminal of the comparator 150. An input terminal of the NAND gate 156 is coupled to an output terminal of the comparator 151. Another input terminal of the NAND gate 156 is coupled to an output terminal of the NAND gate 155. An output terminal of the NAND gate 156 is coupled to another input terminal of the NAND gate 155. The output terminal of the NAND gate 155 is coupled to an input terminal of the inverter 158. The oscillation signal IPS is generated by an output terminal of the inverter 158. The output terminal of the inverter 158 is further coupled to an input terminal of the inverter 159. An output terminal of the inverter 159 is coupled to control the switch 125.

Figure 7:
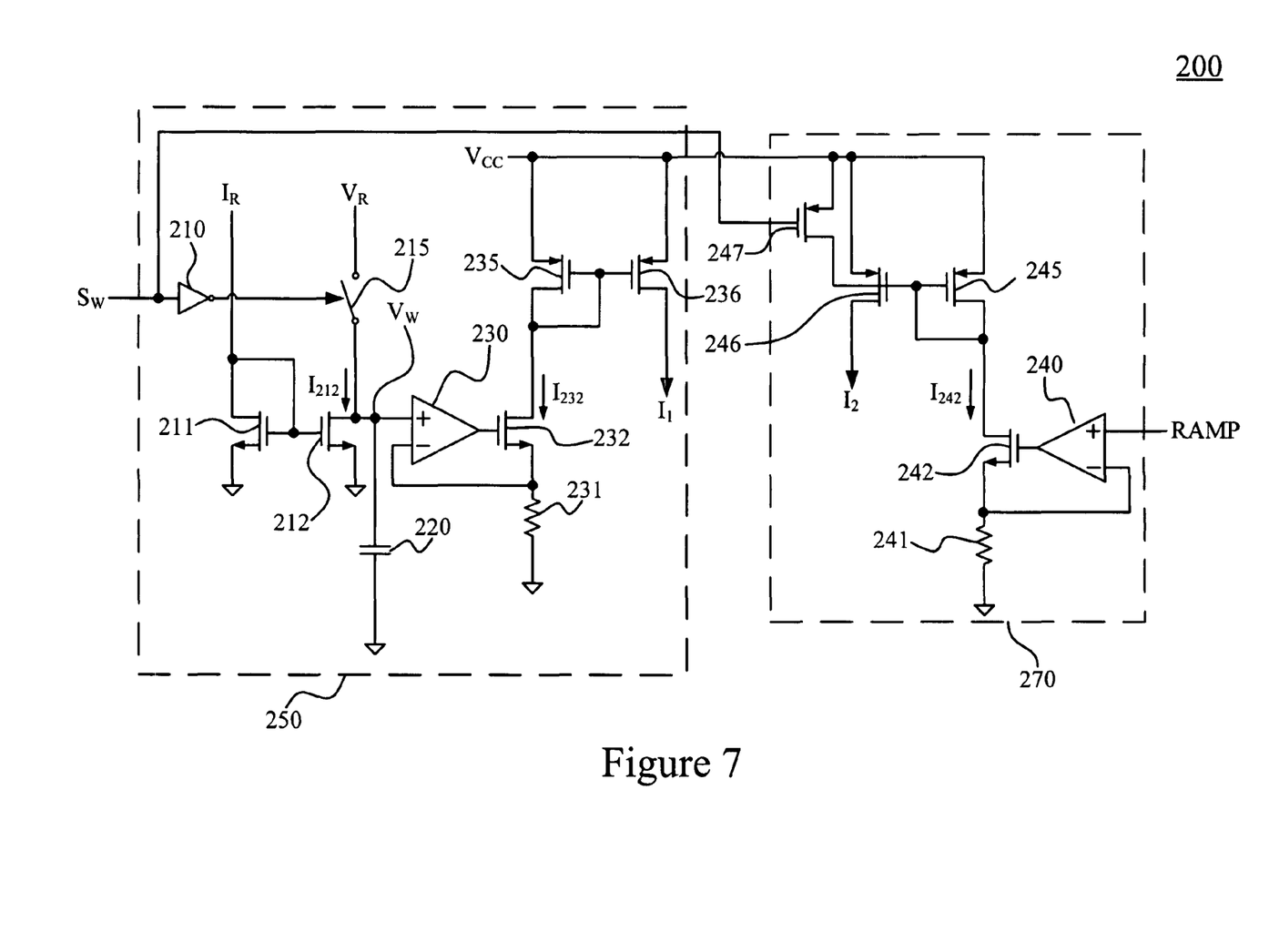
FIG. 7 shows a circuit diagram of a preferred embodiment of a signal generation circuit in accordance with the present invention.

FIG. 7 is a circuit diagram of a preferred embodiment of the signal generation circuit 200. It includes a first signal generator 250 and a second signal generator 270. The second signal generator 270 coupled to the oscillation circuit 100 to generate the second compensation signal $I_2$ in response to the ramp signal RAMP. The first signal generator 250 is coupled to the switching circuit 60 to generate the first compensation signal $I_1$ in response to the switching signal $S_W$. The second signal generator 270 includes an operational amplifier 240, transistors 242, 245, 246, 247 and a resistor 241. An input terminal of the operational amplifier 240 is coupled to receive the ramp signal RAMP. Another input terminal of the operational amplifier 240 is coupled to the source of the transistor 242. An output terminal of the operational amplifier 240 is coupled to the gate of the transistor 242. The resistor 241 is coupled between the source of the transistor 242 and the ground. The drain of the transistor 242 generates a current $I_{242}$ in response to the ramp signal RAMP. The transistors 245 and 246 develop a current mirror to receive the current $I_{242}$ for generating the second compensation signal $I_2$. The sources of the transistors 245 and 246 are coupled to the supply voltage $V_{CC}$. The gates of the transistors 245, 246 and the drain of the transistor 245 are coupled together. The drain of the transistor 245 is further coupled to the drain of the transistor 242 to receive the current $I_{242}$. The drain of the transistor 246 generates the second compensation signal $I_2$ in response to the current $I_{242}$.

The operational amplifier 240, the transistors 242 and the resistor 241 develop a voltage-to-current converter coupled to receive the ramp signal RAMP for generating the second compensation signal $I_2$ through transistors 245 and 246. The transistor 247 is equipped to turn off the transistors 245, 246 in response to the turn off of the switching signal $S_W$. The source, the drain and the gate of the transistor 247 are coupled to the supply voltage $V_{CC}$, the gates of the transistor 245, 246 and the switching signal $S_W$ respectively. Since the ramp signal RAMP is increased in response to the turn on of the switching signal $S_W$, the second compensation signal $I_2$ and the second signal $V_2$ is increased from a first level to a second level during a period when the power transistor 42 is turned on.

The first signal generator 250 includes a current mirror having transistors 211 and 212. The sources of the transistors 211 and 212 are coupled to the ground. The gates of the transistors 211, 212 and the drain of the transistor 211 are coupled together. The drain of the transistor 211 receives the reference current signal $I_R$ of the oscillation circuit 100 to generate a current $I_{212}$ at the drain of the transistor 212. The current $I_{212}$ severs as a discharge circuit to couple to discharge a capacitor 220 for generating a waveform signal $V_W$. Since the current $I_{212}$ is mirrored from the reference current signal $I_R$, and the ramp signal RAMP is generated according to the charging from the current $I_{113}$ mirrored from the reference current signal $I_R$ shown in FIG. 6. The discharge rate of the waveform signal $V_W$ is correlated to the increase rate of the ramp signal RAMP. A switch 215 severs as a charge circuit. The switch 215 is coupled between a reference voltage signal $V_R$ and the capacitor 220. The reference voltage signal $V_R$ is coupled to charge the capacitor 220 through the switch 215. The switch 215 is controlled by the switching signal $S_W$ through an inverter 210. The capacitor 220 is therefore discharged when the switching signal $S_W$ is turned on.

An operational amplifier 230, a transistor 232 and a resistor 231 develop another voltage-to-current converter coupled to receive the waveform signal $V_W$ for generating the first compensation signal $I_1$ through transistors 235 and 236. An input terminal of the operational amplifier 230 is coupled to receive the waveform signal $V_W$. Another input terminal of the operational amplifier 230 is coupled to the source of the transistor 232. An output terminal of the operational amplifier 230 is coupled to the gate of the transistor 232. The resistor 231 is coupled between the source of the transistor 232 and the ground. The drain of the transistor 232 generates a current $I_{232}$ in response to the waveform signal $V_W$. The transistor 235 and 236 are developed a current mirror to receive the current $I_{232}$ for generating the first compensation signal $I_1$. The sources of the transistors 235 and 236 are coupled to the supply voltage $V_{CC}$. The gates of the transistors 235, 236 and the drain of the transistor 235 are coupled together. The drain of the transistor 235 is further coupled to the drain of the transistor 232 to receive the current $I_{232}$. The drain of the transistor 236 generates the first compensation signal $I_1$ in response to the current $I_{232}$. The first compensation signal $I_1$ and the first signal $V_1$ are thus decreased from a first magnitude to a second magnitude during a time when the power transistor 42 is turned on. The first signal $V_1$ is coupled to limit the switching current $I_P$ of the power transistor 42.

Figure 8:
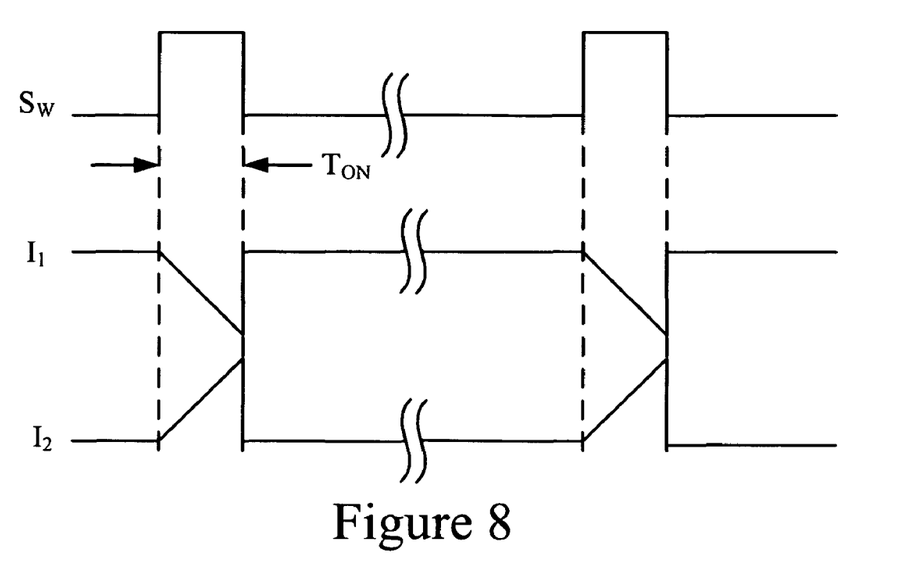
FIG. 8 shows waveforms of compensation signals of the signal generation circuit in accordance with the present invention.

FIG. 8 shows waveforms of the first compensation signal $I_1$ and the second compensation signal $I_2$. The increase rate of the second compensation signal $I_2$ is same as the decrease rate of the first compensation signal $I_1$. The offset of the first compensation signal $I_1$ and the second compensation signal $I_2$ is approximate zero. The variation of a current $I_0$ that flows to the current signal $V_1$ is keep as a constant. A simple circuit accomplishes both slope compensation and the power limit compensation. The slope compensation and the power limit compensation are not mutually interfered. High accurate compensations can therefore be achieved.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A circuit for controlling a power converter, comprising:
a power transistor coupled to a transformer for switching the transformer;
a current sense circuit generating a current signal in response to a switching current of the transformer;
a switching circuit coupled to receive the current signal and a feedback signal to generate a switching signal for controlling the power transistor and regulating the output of the power converter; and
a signal generation circuit generating a first compensation signal and a second compensation signal coupled to adjust the current signal;
wherein the first compensation signal is coupled to adjust the current signal for an output power limit of the power converter, the second compensation signal is coupled to adjust the current signal for a slope compensation, wherein the current signal is compared to the feedback signal for controlling the switching signal.

2. The circuit for controlling the power converter as claimed in claim 1, wherein the feedback signal is produced in response to the output of the power converter.

3. The circuit for controlling the power converter as claimed in claim 1, wherein the first compensation signal and the second compensation signal are generated in response to the switching signal.

4. The circuit for controlling the power converter as claimed in claim 1, wherein the second compensation signal adjusts the current signal for generating a second signal coupled to a feedback loop of the power converter, wherein the second signal is increased from a first level to a second level during a period when the power transistor is turned on.

5. The circuit for controlling the power converter as claimed in claim 1, wherein the first compensation signal adjusts the current signal for generating a first signal coupled to limit the switching current, wherein the first compensation signal is decreased from a first magnitude to a second magnitude during a time when the power transistor is turned on.

6. The circuit for controlling the power converter as claimed in claim 1, wherein the offset of the first compensation signal and the second compensation signal is approximate zero.

7. The circuit for controlling the power converter as claimed in claim 1, further comprising an oscillation circuit generating an oscillation signal coupled to the switching circuit and the signal generation circuit for generating the switching signal and the second compensation signal.

8. The circuit for controlling the power converter as claimed in claim 1, wherein the switching circuit comprises:
a current limit threshold;
a first comparator having an input terminal coupled to receive the current limit threshold, and another input terminal coupled to receive the current signal and the first compensation signal; and
a second comparator having an input terminal of the second comparator coupled to receive the feedback signal, and another input terminal of the second comparator coupled to receive the current signal and the second compensation signal;
wherein the output of the first comparator and the output of the second comparator are coupled to turn off the power transistor.

9. The circuit for controlling the power converter as claimed in claim 1, wherein the signal generation circuit comprises:
a first signal generator coupled to the switching circuit to generate the first compensation signal in response to the switching signal; and
a second signal generator coupled to an oscillation circuit to generate the second compensation signal in response to a ramp signal of the oscillation circuit.

10. A circuit for controlling a power converter, comprising:
a power transistor coupled to a transformer for switching the transformer;
a current sense circuit generating a current signal in response to a switching current of the transformer;
a switching circuit coupled to receive the current signal and a feedback signal to generate a switching signal for controlling the power transistor and regulating the output of the power converter; and
a signal generation circuit generating a first compensation signal coupled to adjust the current signal;
wherein the current signal is adjusted for an output power limit of the power converter;
wherein the signal generation circuit further generates a second compensation signal coupled to adjust the current signal for a slope compensation of the power converter, in which the offset of the first compensation signal and the second compensation signal is approximate zero.

11. The circuit for controlling the power converter as claimed in claim 10, wherein the feedback signal is produced in response to the output of the power converter.

12. The circuit for controlling the power converter as claimed in claim 10, wherein the first compensation signal is decreased from a first magnitude to a second magnitude during a time when the power transistor is turned on.

13. The circuit for controlling the power converter as claimed in claim 10, further comprising an oscillation circuit generating an oscillation signal coupled to the switching circuit for generating the switching signal.

14. The circuit for controlling the power converter as claimed in claim 10, wherein the switching circuit comprises:
a current limit threshold; and
a comparator having an input terminal coupled to receive the current limit threshold, and another input terminal coupled to receive the current signal and the first compensation signal;
wherein the output of the comparator is coupled to turn off the power transistor.

15. The circuit for controlling the power converter as claimed in claim 10, wherein the signal generation circuit comprises:
a capacitor for generating a waveform signal;
a charge circuit coupled to charge the capacitor in response to the switching signal; and
a discharge circuit coupled to discharge the capacitor when the power transistor is turned on;
wherein the first compensation signal is generated in response to the waveform signal.

16. A circuit of providing compensation for a power converter, comprising:
a current sense circuit generating a current signal in response to a switching current of a power transistor of the power converter; and
a signal generation circuit generating a first compensation signal coupled to adjust the current signal;
wherein the current signal is adjusted for limiting the switching current of the power transistor;
wherein the signal generation circuit further generates a second compensation signal coupled to adjust the current signal for a slope compensation of the power converter, in which the offset of the first compensation signal and the second compensation signal is approximate zero.

17. The circuit as claimed in claim 16, wherein the first compensation signal is decreased from a first magnitude to a second magnitude during a time when the power transistor is turned on.

18. The circuit as claimed in claim 16, further comprising:
a current limit threshold; and
a comparator having an input terminal coupled to receive the current limit threshold, and another input terminal coupled to receive the current signal and the first compensation signal;
wherein the output of the comparator is coupled to turn off the power transistor.

19. The circuit as claimed in claim 16, wherein the signal generation circuit comprises:
a capacitor for generating a waveform signal;
a charge circuit coupled to charge the capacitor when the power transistor is turned off; and
a discharge circuit coupled to discharge the capacitor when the power transistor is turned on;
wherein the first compensation signal is generated in response to the waveform signal.

20. A method for controlling a power converter, comprising:
generating a current signal from a current sense circuit in response to a switching current of a transformer;
generating a first compensation signal from a signal generation circuit to adjust the current signal for a power limit of the power converter;
generating a switching signal from a switching circuit for controlling a power transistor coupled to the transformer in response to the adjusted current signal and a feedback signal; and,
generating a second compensation signal from the signal generation circuit to adjust the current signal for a slope compensation;
wherein the second compensation signal is increased from a first level to a second level during a period when the power transistor is turned on.

21. The method for controlling the power converter as claimed in claim 20, further comprising:
generating the feedback signal in response to the output of the power converter.

22. The method for controlling the power converter as claimed in claim 20, wherein the first compensation signal is decreased from a first magnitude to a second magnitude during a time when the power transistor is turned on.

23. The method for controlling the power converter as claimed in claim 20, wherein the first compensation signal is generated in response to the switching signal.

24. The method for controlling the power converter as claimed in claim 20 wherein the offset of the first compensation signal and the second compensation signal is approximate zero.

25. The method for controlling the power converter as claimed in claim 20 further comprising:
comparing the feedback signal with the adjusted current signal to turn off the switching signal.

26. The method for controlling the power converter as claimed in claim 20, wherein the second compensation signal is generated in response to the switching signal.

27. The method for controlling the power converter as claimed in claim 20, further comprising:
providing a current limit threshold; and
comparing the current limit threshold with the adjusted current signal to turn off the switching signal.

28. The method for controlling the power converter as claimed in claim 20, wherein the step of generating the first compensation signal comprises:
generating a waveform signal in response to the switching signal; and
generating the first compensation signal in response to the waveform signal.

29. The method for controlling the power converter as claimed in claim 20, further comprising:
generating an oscillation signal from an oscillation circuit for generating the switching signal.

* * * * *